United States Patent [19]

Woodhouse

[11] Patent Number: 4,813,632
[45] Date of Patent: Mar. 21, 1989

[54] BALLAST MANAGEMENT SYSTEM FOR LIGHTER THAN AIR CRAFT

[75] Inventor: Geoffrey D. Woodhouse, Phoenix, Ariz.

[73] Assignee: Allied-Signal Inc., Morris Township, Morris County, N.J.

[21] Appl. No.: 32,796

[22] Filed: Mar. 31, 1987

[51] Int. Cl.[4] .......... B64B 1/70; B64C 17/08
[52] U.S. Cl. .......... 244/95; 244/94; 62/93; 60/309; 165/7; 165/111; 165/913
[58] Field of Search .......... 244/94, 95, 97; 60/309, 60/320; 165/7, 111, 913; 55/267, 269, DIG. 30; 62/93

[56] References Cited

U.S. PATENT DOCUMENTS

| | | | |
|---|---|---|---|
| 1,426,047 | 8/1922 | Cooke | 244/95 |
| 1,576,859 | 3/1926 | Sieck . | |
| 1,598,002 | 8/1926 | Parker . | |
| 1,645,065 | 10/1927 | Liebert et al. | 244/95 |
| 1,653,603 | 12/1927 | Schroder | 244/95 |
| 1,772,161 | 8/1930 | Short . | |
| 2,071,868 | 2/1937 | Von Lude | 244/95 |
| 2,078,532 | 4/1937 | Fischer | 244/95 |
| 2,310,767 | 2/1943 | Durr | 244/95 |
| 2,466,421 | 4/1949 | Hall . | |
| 2,479,766 | 8/1949 | Mulvany | 244/95 |
| 3,077,926 | 2/1963 | Fikenscher | 165/7 |
| 3,204,401 | 9/1965 | Serriades | 244/95 |
| 4,656,831 | 4/1987 | Budininkas et al. | 60/297 |

FOREIGN PATENT DOCUMENTS 2059898  4/1981  United Kingdom .......... 244/95

Primary Examiner—Galen Barefoot
Assistant Examiner—Rodney Corl
Attorney, Agent, or Firm—R. Steven Linne; James W. McFarland

[57] ABSTRACT

A system for automatically controlling the buoyancy of a lighter-than-air craft by condensing water ballast from engine exhaust gases.

22 Claims, 1 Drawing Sheet

BALLAST MANAGEMENT SYSTEM FOR LIGHTER THAN AIR CRAFT

BACKGROUND OF THE INVENTION

This invention relates generally to field of lighter-than-air craft and more specifically to a system for stabilizing the weight of such airships by making water ballast from the exhaust gases created by burning hydrocarbon fuel for propulsion or other purposes.

In such airships, the buoyancy is usually controlled by ballast which is added and/or dumped to compensate for lift variables such as helium volume (changes due to leakage and atmospheric heating) and, more importantly, the weight of fuel consumed. In the case of long range maritime airships, this ballast is customarily sea water which necessitates frequent descents to the surface to take on additional ballast. Not only is this operation hazardous in high wind, high seas conditions, but, especially in the case of maritime surveillance airships, this operation reduces the effectiveness of the surveillance during those periods when the airship is at the surface taking on ballast. Moreover, considerable time and skill is needed on the part of the crew to continuously calculate the state of buoyancy and manage the ballast accordingly.

It has already been suggested to simply condense water from engine exhaust gases and store this water as ballast. See, for example, U.S. Pat. Nos. 1,426,047; 1,576,859; 1,598,002; 1,645,065; 1,653,603; 2,310,767 and 2,479,766. However, the excess weight or bulk, parasitic power loss, and lack of dependability of previous designs has limited their value to various minor degrees of success for over fifty years.

Some of the more serious problems of these prior systems are discussed in the aforementioned U.S. Pat. Nos. 1,653,603 and 2,078,532.

Therefore, it is an object of the present invention to overcome the Problems and disadvantages of previous systems and provide an improved means for automatically controlling the buoyancy of a lighter-than-air craft.

SUMMARY OF THE INVENTION

In accordance with these objectives, the present invention, in its most general sense, comprises the combination of an internal combustion engine, an exhaust gas precooler, a water separator, and optionally a control computer.

The internal combustion engine is most preferably a recuperated gas turbine type of engine since that type produces a much cleaner and steady exhaust gas flow at a relatively low temperature (e.g. below about 800° F.) compared to other types of engines (e.g. above about 1000° F.). Such engines are also ideally suited for propulsion and as auxiliary power units. Modern aircraft often have several gas turbines in operation at any one time but it is not required that all of the exhaust gas from every engine be treated by the system of the present invention. Since the combustion of conventional hydrocarbon fuels in a gas turbine is highly efficient, each engine will produce about 1.3 times as much water vapor, by weight, than the amount of fuel consumed.

The exhaust gas precooler is a key element for reducing the parasitic losses of this system to acceptable levels. It is most preferably a rotatable, high efficiency heat exchange element made of a honeycomb or porous metal or ceramic and is designed to transfer heat between two gas streams of dissimilar temperature. It performs this function by continuously rotating a short cylinder or disc between the two streams so as to alternately heat that portion of the disc matrix exposed to the hot stream and then give up that heat as the disc rotates, moving the hot segment into the cooler gas stream. Thus, the hot exhaust gas enters the precooler and gives up thermal energy to the rotating matrix so that the gas leaving the precooler is at a significantly lower temperature. A temperature drop of over 600° F. has been found to be practical. It is preferred that the exhaust gas not be cooled below its dew point in the precooler since the condensation of water vapor is more efficiently carried out in the water separator section.

The water separator consists of a vapor cycle refrigeration loop (e.g. Freon compressor-condenser-evaporator) in which the cold evaporator heat exchange unit is exposed to the flow of precooled exhaust gas to further lower its temperature. When the exhaust gas is cooled to or below its dew point, water vapor is condensed. The water is extracted from the system and conveyed to the ballast tanks. The degree of cooling in the water separator, and hence the rate of water extraction, is governed by the loading on the refrigerant loop and more particularly by the speed of the compressor motor. The compressor is preferably electrically driven and controlled by a subcomponent of the airship's onboard flight data computer.

A ballast control means or computer automatically increases or decreases the refrigeration rate so as to maintain sufficient ballast to compensate for fuel consumed and other buoyancy factors.

BRIEF DESCRIPTION OF THE DRAWING

While this specification concludes with claims particularly pointing out and distinctly claiming the subject matter which is regarded as the invention, it is believed that the invention, objects, features, and advantages thereof may be better understood from the following detailed description of a presently preferred embodiment when taken in connection with the accompanying drawing in which:

DESCRIPTION OF THE PREFERRED EMBODIMENT

Figure 1:
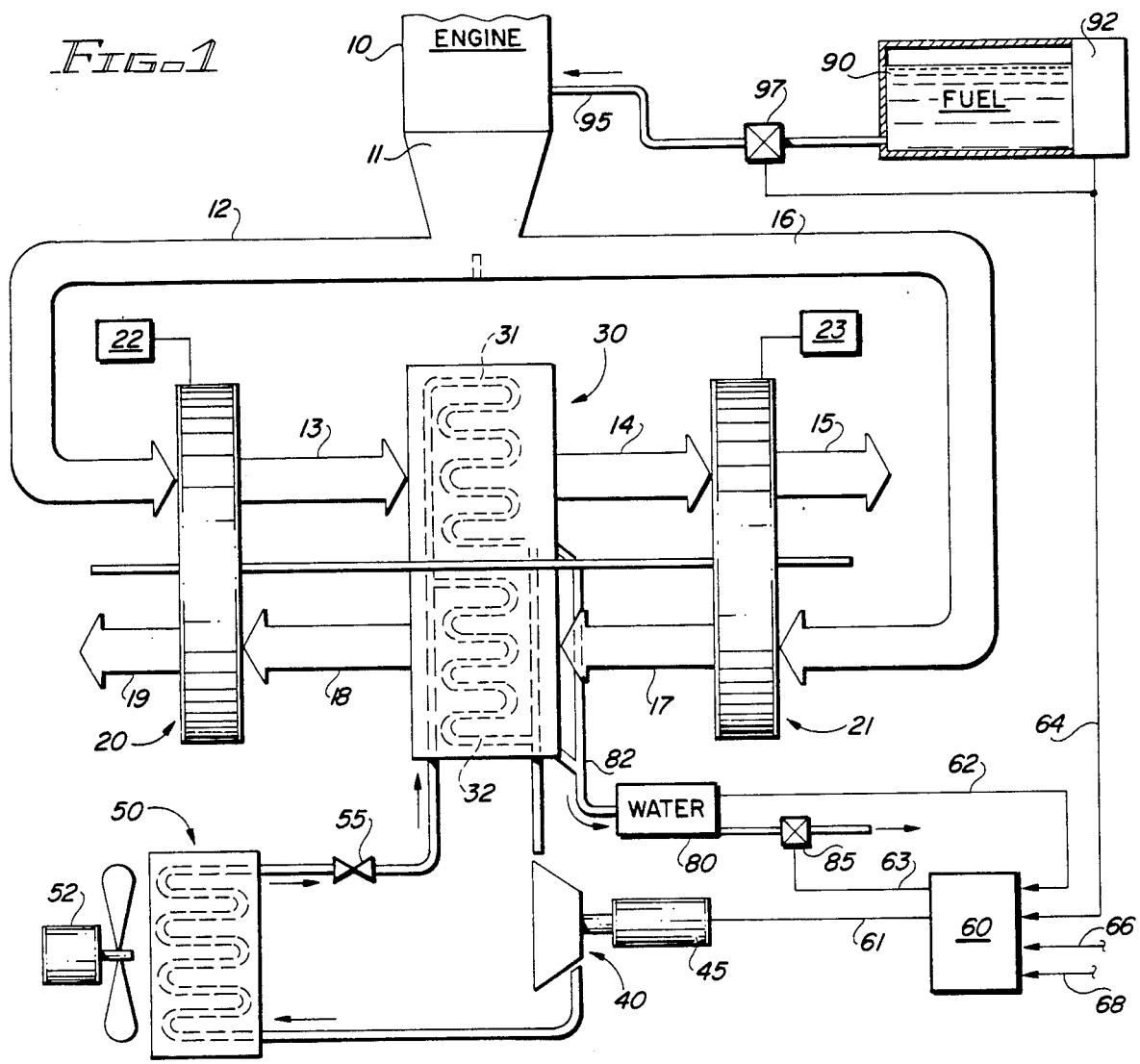
FIG. 1 is a diagrammatic illustration of the presently preferred embodiment of the instant invention showing the exhaust gas flow path through the overall system and the ballast control means which governs a refrigeration loop to make water ballast to compensate for fuel consumed by the engines.

Referring to FIG. 1, the apparatus of the present invention includes an internal combustion engine (10) which burns conventional liquid hydrocarbon fuel supplied from fuel tanks (90) through fuel supply lines (95). Preferably, the amount of fuel consumed is monitored by any conventional means. For example, a fuel flow measuring device (97) may be placed in the supply line (95) or a fuel level detector (92) may be placed in the tanks (90).

The hot (typically above 700° F.) engine exhaust gases are collected, for example by ducting (11), and, in this preferred embodiment, split into two streams (12 and 16) for treatment. Each of the streams is passed through a first rotating precooler wheel (20,21) where each gives up a substantial portion of its heat to the precooler matrix. The now cool (typically below about 100° F.) gas streams (13,17) pass through the water separator unit (30) which contains cold refrigeration coils (31,32). The exhaust gases are chilled sufficiently below the dew point (e.g. about 40° F.) for water vapor to be condensed out as liquid water which flows through a drain (82) to a water storage tank (80) for use as ballast. The now cold (e.g. 40° F.) exhaust gas streams (14,18) are passed through a second rotating precooler wheel (20,21) where they absorb heat from the precooler matrix. The warm (e.g. 670° F.) gas streams (15,19) are then vented to the atmosphere and discarded.

Note that similar results could be obtained with only one precooler wheel if the exhaust gases are not split into two streams but rather are passed through the hot section of the wheel (shown as area 28 in FIG. 2) to give up most of its heat to the wheel matrix (26). The one gas stream is then passed through the water separator unit (30) as before to condense out water vapor. Finally, the one gas stream is passed through the cool section (27) of the one precooler wheel where it absorbs heat from the wheel matrix (26) before being discharged to the atmosphere.

Figure 2:
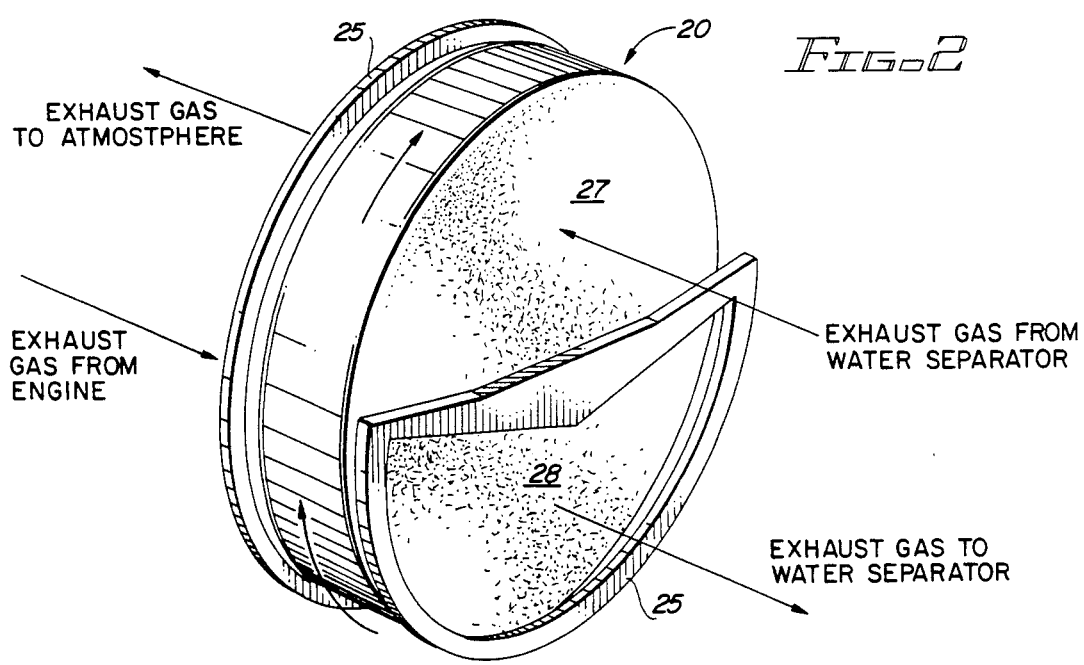
FIG. 2 is a more detailed illustration of the rotary precooler of the present invention.

An important aspect of these embodiments is the rotating precooler wheel, shown in more detail in FIG. 2, which is generally known in the heat-exchange art for other uses. It is designed to transfer heat from a hot gas stream into a cooler gas stream by alternately heating and cooling a thermal mass. It is constructed as a rotatable disk (20) containing a porous matrix or core (26) which could be metal but is preferably a ceramic such as magnesium aluminum silicate, or aluminum silicate, or other similar materials. These materials have demonstrated superb thermal stability and corrosion resistance in gas turbine exhaust applications. The manufacturing technology used to make these precooler cores is similar to that used in the production of automotive catalytic converter substrates. They may be formed by extruding sections of "green" ceramic material followed by assembling the sections and firing the ceramic to complete the process, or they may be laminated from a corrugated ceramic "paper" which is wrapped in a spiral fashion around a mandrel and then fired. The extrusion process has the advantage of matrix uniformity and virtually no length restrictions, whereas the wrapped configuration has minimal wall porosity. More details of the manufacturing process are disclosed in U.S. Pat. No. 4,256,172 and the references cited therein, all of which are incorporated herein by reference.

Since this precooler core physically removes heat from the exhaust stream at one point and redeposits it back into the stream at another point, it must rotate in order to function. One way to accomplish this is to provide a large external ring gear (not shown) resiliently mounted to the precooler core which can be driven by an electric motor (22,23). Preferably, the precooler (20) is also provided with sliding gas seals (25) to direct the gas flow through the proper section of the precooler without significant leakage or bypassing.

The preferred counterflow configuration, in which the hot and cold gas streams flow in opposite directions through the precooler, provides for very low fouling of the heat exchange matrix. This avoids one of the more serious problems of the prior art.

The water separator unit (30) is essential to the functioning of the rotary precooler since it chills the exhaust gas stream, in order to condense out the water vapor, and it is this chilled gas stream which provides the cold sink for the precooler. It is similar to any conventional refrigeration system in that a vapor (e.g. Freon) compressor (40) is driven by an electric motor (45) to pump Freon around a loop consisting of an air cooled condenser coil (50), an expansion valve (55), and evaporator coils (31,32) in the water separator unit (30). Preferably, the condenser (50) is cooled by an electric fan (52) but it could also be cooled by the normal air flow past the ship.

While the water separator could be set to run continuously to condense out water ballast, it is preferred that it be automatically controlled to produce only as much water as is necessary. In this preferred embodiment, a control means (60), such as a component of the on-board flight data computer, receives signals related to the factors which affect the buoyancy of the airship and then sends signals (61) to the compressor motor (45) and/or signals (63) to a water dump valve (85) to manage the ballast accordingly.

For example, one signal (62) reports on the current amount of water ballast in the tanks (80) while another signal (64) is related to the amount of fuel consumed by reporting either the current fuel level from a sensor (92) in the fuel tanks (90) or by integrating the total fuel flow through sensor (97). Other signals (66,68) may be related to the helium volume, atmospheric variables such as temperature and pressure, or the pilot's desire to ascend or descend.

While the invention has been described in terms of one preferred embodiment, it is expected that various alterations, modifications, or permutations thereof will be apparent to those skilled in the art. Therefore, it is intended that equivalents be embraced within the spirit and scope of the invention as it is defined by the appended claims.

What is claimed is:

1. A ballast making system for lighter than air craft comprising the combination of:
    an internal combustion engine adapted to burn hydrocarbon fuel and produce hot exhaust gases,
    an exhaust gas precooler means for substantially lowering the temperature of exhaust gas by heat-exchange with chilled exhaust gas,
    a water separator means for chilling, and condensing water vapor from, the precooled exhaust gases,
    means for directing the chilled exhaust gases from the water separator to the precooler, and
    a water ballast holding means for collecting the condensed water vapor for use as ballast.

2. The apparatus of claim 1 wherein said exhaust gas precooler means comprises a rotatable disk having a porous core which is adapted to extract heat from exhaust gas passing therethrough.

3. The apparatus of claim 2 wherein said porous core is constructed from a ceramic selected from the group comprising magnesium aluminum silicate, aluminum silicate, and combinations thereof.

4. The apparatus of claim 2 further including motor means for rotating said disk through said hot exhaust gases and into a chilled gas stream.

5. The apparatus of claim 1 wherein said water separator means comprises a refrigeration system including:
    a motor;
    a vapor compressor driven by said motor; and adapated to pump refrigerant around the system, an evaporator coil in communication with said compressor and adapted to expose the refrigerant in heat exchange relationship to the precooled exhaust gases in order to chill said gases and condense water vapor therefrom, and drain means for collecting any water condensed out of said exhaust gases.

6. The apparatus of claim 5 further including control means for varying said motor and compressor in order to adjust the rate at which water is condensed out of the exhaust gases.

7. The apparatus of claim 2 wherein the means for directing the chilled exhaust gases from the water separator to the precooler includes means for directing the chilled gases opposite to the direction of flow of the hot exhaust gases through the precooler in order to provide a cold sink therein.

8. The apparatus of claim 2 further including seal means for preventing significant commingling of the chilled gases with the hot gases in the precooler.

9. Apparatus for extracting water from the hot exhaust gases produced by a gas turbine engine comprising the combination of:

first duct means for carrying at least a portion of said hot gases from said engine;

a gas precooler means for substantially lowering the temperature of said hot gases, said means precooler having a rotatable porous ceramic core and divided into two portions, including a first portion for receiving hot gases from said first duct means so that the core is in heat exchange relationship with said hot gases and a second portion in which the core is in heat exchange relationship with a chilled gas stream;

motor means for rotating said core from the first portion of the precooler means to the second portion of the precooler means;

second duct means for receiving and directing the precooled exhaust gases from the first portion of the precooler means to a water separator means;

a water separator means for receiving, chilling, and condensing water vapor from, the precooled exhaust gases, said separator means having a motor driven compressor adapted to pump refrigerant from an evaporator coil, which is in heat exchange relationship with said precooled gases, to an air cooled condenser coil, which is in heat-exchange relationship with the atmosphere;

water recovery means for collecting the liquid water condensed out of the chilled exhaust gases; and third duct means for directing the chilled exhaust gases from the water separator means to and through the said second portion of the precooler means.

10. A method of making ballast in a lighter than air craft of the type having hydrocarbon fuel burning engines on board, comprising the steps of:

(a) flowing the hot products of combustion from an engine to an exhaust gas precooler, (b) substantially lowering the temperature of the hot exhaust gases by heat exchange with chilled exhaust gases in the precooler but without condensing water vapor therefrom, (c) flowing the cooled exhaust gases from the precooler to a water separator, (d) further chilling the cooled exhaust gases below the dewpoint to condense water therefrom in the water separator, and (e) flowing the chilled exhaust gases back to the precooler for heat exchange with the hot exhaust gases while collecting the condensed water for use as ballast.

11. The method of claim 10 wherein step (b) further includes the (1) flowing the hot exhaust gases into and through a cool portion of a rotatable ceramic core mounted in the precooler, (2) allowing said portion to absorb heat from the hot gases thereby heating the core while lowering the temperature of the exhaust gases, (3) rotating the heated portion of the core into a chilled exhaust gas stream, (4) allowing the core to transfer heat to the chilled exhaust gas stream thereby cooling that portion of the core while warming the gas stream, (5) rotating the cooled portion of the core back into the hot exhaust gases, and (6) repeating steps (1) to (5) to continuously lower the temperature of the hot exhaust gases and thereby discharge cooled exhaust gases from the precooler for further treatment.

12. The method of claim 10 wherein step (d) further includes the (1) providing a motor driven refrigerant compressor in communication with a cold evaporator coil and an air-cooled condenser coil, (2) flowing the cooled exhaust gases into heat exchange relationship with said cold evaporator coil, and (3) chilling said exhaust gases sufficiently to cause water vapor to be condensed therefrom.

13. The method of claim 11 further including the step of flowing the chilled exhaust gases in a direction opposite to the flow of hot exhaust gases through the precooler.

14. The method of claim 12 further including the step of controlling the compressor motor to vary the rate at which water is condensed from the exhaust gases.

15. The method of claim 14 wherein the step of controlling the compressor motor includes the steps of:

sensing a command signal relating to a desired change in aircraft altitude;

sensing the actual change in altitude;

computing the difference between the desired change and the actual change in altitude;

adjusting the compressor motor to increase the rate of water condensing if the difference indicates that the aircraft's altitude is increasing more than desired; and adjusting the compressor motor to decrease the rate of water condensing if the difference indicates that the aircraft's altitude is decreasing more than desired.

16. The method of claim 15 further including the steps of sensing the presence of water ballast in storage tanks and, if the aircraft's altitude is decreasing more than desired, then signaling a ballast dump valve to allow water to drain overboard from the storage tanks.

17. A ballast management system for aircraft comprising:

a gas turbine engine producing hot exhaust gases;

a precooler receiving at least a portion of said exhaust gases and operable to substantially lower the temperature thereof by heat exchange with chilled gas;

a water separator receiving said exhaust gases from said precooler and chilling said exhaust gases sufficiently to condense water vapor therefrom;

means for collecting the condensed water for use as ballast; and means for regulating the rate at which water vapor is condensed from the exhaust gases.

18. A ballast management system as set forth in claim 17 wherein said means for regulating comprises means associated with said water separator for controlling the degree of chilling of said exhaust gases to regulate said rate at which water vapor is condensed.

19. The apparatus of claim 18 wherein said water separator includes a refrigerant compressor in communication with an evaporator coil in heat exchange relationship with said exhaust gases, and wherein said means for controlling the degree of chilling includes means for adjusting the speed of rotation of said compressor.

20. The apparatus of claim 19 wherein said means for regulating the rate at which water vapor is condensed from the exhaust gases includes control means for receiving signals related to factors which affect the buoyancy of the airship and for sending signals to the means for adjusting the speed of the refrigerant compressor so that the amount of water ballast is automatically controlled to achieve a desired altitude.

21. A ballast making system comprising:

a gas turbine engine producing hot exhaust gases;

a precooler heat exchanger having hot pass and cool pass sides, said hot pass side receiving said hot exhaust gases from said engine and operable to substantially lower the temperature thereof;

water separator means, downstream of and receiving exhaust gases from said hot side of the precooler, for further cooling and condensing water vapor from said exhaust gases;

means for collecting condensed water vapor from said separator for use as ballast; and duct means for directing the cooled exhaust gases exiting said separator to said cool pass side of said precooler to provide a heat sink therefor.

22. The apparatus of claim 21 wherein said duct means directs the cooled exhaust gases to flow through said precooler in a direction opposite from the flow of said hot exhaust gases.

* * * * *